(12) United States Patent
Kay

(10) Patent No.: US 6,364,983 B1
(45) Date of Patent: Apr. 2, 2002

(54) MANUFACTURE OF SECURITY TAPES AND SECURITY THREADS

(75) Inventor: Ralph Kay, Basingstoke (GB)

(73) Assignee: De la Rue International Limited, Hampshire (GB)

( * ) Notice: Subject to any disclaimer, the term of this patent is extended or adjusted under 35 U.S.C. 154(b) by 0 days.

(21) Appl. No.: 09/319,535

(22) PCT Filed: Jan. 26, 1998

(86) PCT No.: PCT/GB98/00215

§ 371 Date: Jun. 21, 1999

§ 102(e) Date: Jun. 21, 1999

(87) PCT Pub. No.: WO98/33648

PCT Pub. Date: Aug. 6, 1998

(30) Foreign Application Priority Data

Jan. 31, 1997 (GB) .............................................. 9702064

(51) Int. Cl.⁷ ........................... B44C 1/17; B32B 31/18; B32B 15/08; B41M 3/14
(52) U.S. Cl. ........................ 156/230; 156/237; 156/238; 156/239; 156/240; 156/247; 156/289; 427/146; 427/147; 427/148; 428/209; 428/458; 428/915
(58) Field of Search ................................ 156/230, 231, 156/232, 233, 237, 238, 240, 241, 247, 277, 287; 427/146, 147, 148, 162; 428/209, 458, 914, 915; 365/124, 125

(56) References Cited

U.S. PATENT DOCUMENTS

| | | | | |
|---|---|---|---|---|
| 4,728,377 A | * | 3/1988 | Gallagher | 156/58 |
| 4,856,857 A | * | 8/1989 | Takeuchi et al. | 350/3.6 |
| 4,906,315 A | * | 3/1990 | McGrew | 156/231 |
| 5,342,672 A | * | 8/1994 | Killey | 428/195 |
| 5,817,205 A | * | 10/1998 | Kaule | 156/233 |
| 5,820,971 A | * | 10/1998 | Kaule et al. | 428/209 |
| 6,086,708 A | * | 7/2000 | Colgate, Jr. | 156/277 |

FOREIGN PATENT DOCUMENTS

| | | |
|---|---|---|
| DE | 37 44 650 A1 | 7/1989 |
| EP | 0 319 157 A2 | 6/1989 |
| EP | 0 420 261 A2 | 4/1991 |
| EP | 0 492 407 A1 | 7/1992 |
| EP | 0 624 688 A1 | 11/1994 |
| WO | WO 89/08166 | 9/1989 |
| WO | WO 93/16888 | 9/1993 |

* cited by examiner

Primary Examiner—Richard Crispino
Assistant Examiner—J. A. Lorengo
(74) Attorney, Agent, or Firm—Oliff & Berridge, PLC

(57) ABSTRACT

A method of manufacturing a laminate structure for use in a security thread or tape comprises: i) providing a first structure (1) having a flexible carrier (2) supporting an optically variable effect structure (4–6); ii) adhering the first structure (1) to a flexible substrate (9) with the optically variable effect structure (4–6) between the carrier and the substrate; iii) removing the carrier (2); iv) permanently bonding the carrier (2) to the resulting laminate to generate a final laminate structure; and, v) slitting the laminate structure from step iv) into at least two lengths.

29 Claims, 2 Drawing Sheets

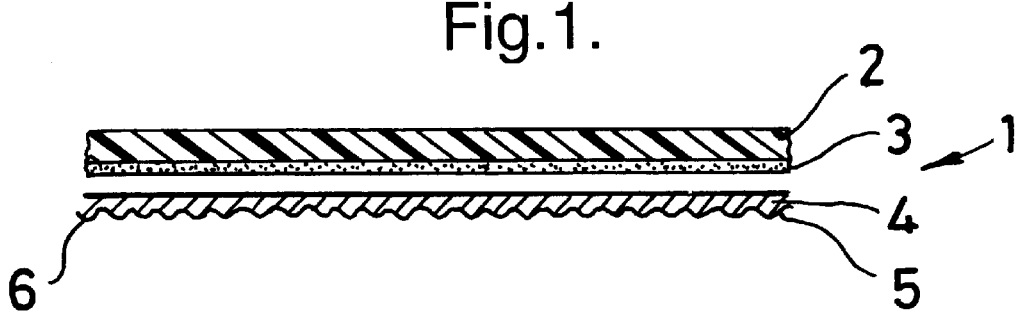
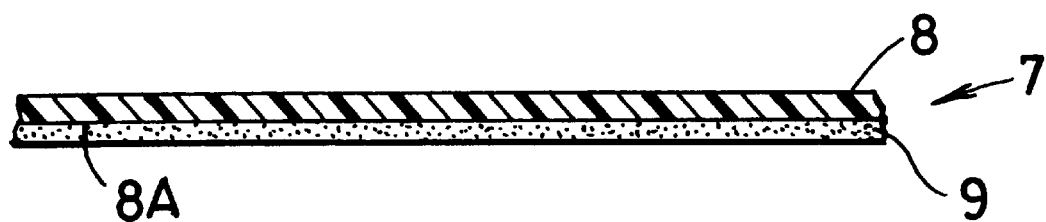
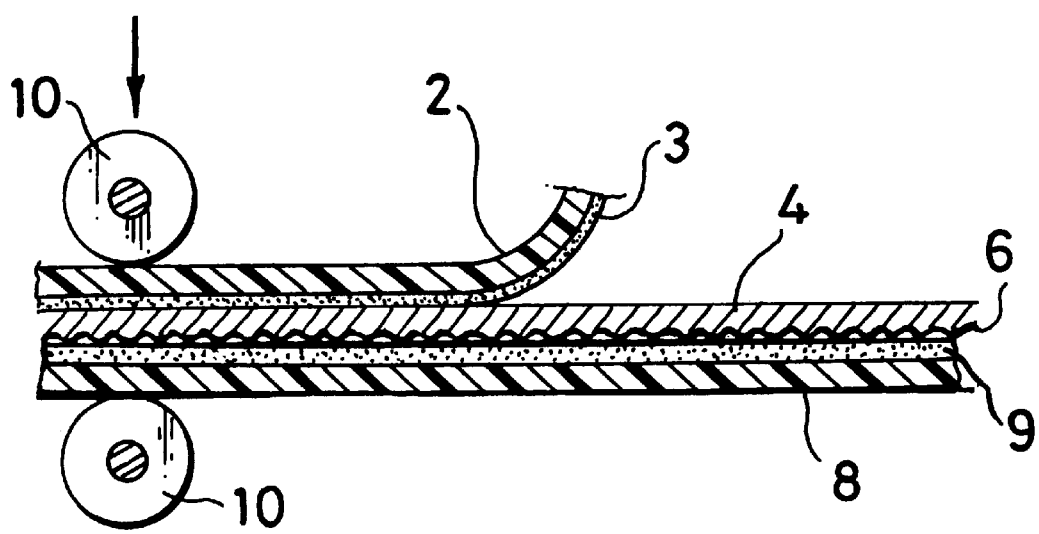

MANUFACTURE OF SECURITY TAPES AND SECURITY THREADS

The invention relates to the manufacture of security tapes and security threads.

Security threads are used widely in security paper for banknotes and the like. Typically, they are incorporated into the banknote paper during manufacture of the paper although in some cases they could be adhered onto a surface of the paper after manufacture of the paper itself. Security tapes are used in a wide variety of applications such as tear tapes and the like.

Several proposals have been made in the past for increasing security of such tapes and threads. In one approach, an optically variable effect structure is directly embossed into a hard polymer such as polyester (PET) to create directly embossed threads. Although the resulting product is satisfactory, this approach requires heavy duty equipment and is generally carried out on widths less than 30 cm. This results in an expensive product and limits the output volume.

A typical example is shown in EP-A-0624688. In this case, holograms are deposited by transfer at predetermined positions along a ribbon and a transparent protective layer and optionally a varnish are then deposited on the ribbon. The resultant sheet is then cut into strips which are introduced into a sheet of paper during its manufacture. This is a relatively expensive process.

DE-A-3744650 describes directly embossing holograms into a varnish film provided with a metallic, reflective layer carried on a polymeric carrier directly. This approach provides an alternative to a transfer process and leaves the resultant hologram substantially unprotected and unless laminated is thus completely unsuitable for the manufacture of security tapes and security threads.

CA-A-2026542 (EP-A-0420261) again discloses a conventional transfer process in which a hologram is transferred from a carrier structure onto a substrate. Part of the carrier structure includes a protective layer which is exposed following the transfer operation to protect the holographic profile which would otherwise be exposed. Again, this is a relatively complex process, particularly since it requires the use of the protective layer. Furthermore, this protective layer is not self-supporting and would not provide the required durability for threads or tapes.

EP-A-0330733 (WO-A-89/08166) describes a security element in the form of a thread or strip including a plastic film having a non-metallic opaque coating with recesses in the form of characters and patterns through which colour contrasting materials can be viewed.

EP-A-0319157 describes a security thread having a continuous metal path along its length.

CA-A-2058268 (EP-A-0492407) has a disclosure very similar to CA 2026542.

In accordance with the present invention, a method of manufacturing a laminate structure for use in a security tape or thread comprises:

i) providing a first structure having a flexible carrier supporting an optically variable effect structure;

ii) adhering the first structure to a flexible substrate with the optically variable effect structure between the carrier and the substrate;

iii) removing the carrier;

iv) permanently bonding the carrier to the resulting laminate to generate a final laminate structure; and, v) slitting the laminate structure from step iv) into at least two lengths.

The invention avoids the direct approach described above by using a multi-layer structure, the optically variable effect structure being adhered to the substrate following its creation. In this way, particularly in the case of embossing, the optically variable effect part of the structure is protected within the overall laminate. Furthermore, the use of a multi-layer structure allows a wide combination and selection of security print and other entities to be incorporated leading to considerable flexibility of design. The resulting laminate has high performance and durability and yet is much cheaper to manufacture and can be manufactured in wide widths of up to 1 m or more. Typically, the resulting laminate will withstand the high temperatures and corrosive conditions during incorporation into paper and have a brightness and durability which will last for the lifetime of the security document in which it is incorporated.

A further important advantage of the invention lies in the re-use of the carrier. Not only does this significantly reduce the cost of producing the security tape or thread since no additional material is required to provide the permanently bonded layer, but in addition allows very durable optically variable effect structures to be obtained. This is achieved by first providing that structure on a removable carrier where the bonding strength is much less than is obtained during the permanent bonding step iv), thus allowing large sheets to be embossed relatively easily, and secondly, by permanently bonding the carrier to the laminate after it has been provided with the optically variable effect structure.

The flexibility of this laminate approach will be appreciated from the following discussion illustrating the different types of materials which can be included within the laminate.

The optically variable effect generating structure provided in step i) can have any conventional form and can be used to generate holographic or diffraction grating effects and the like. Typically, the structure comprises a layer, such as a lacquer, which is modified so as to generate the optically variable effect as well as being optionally tinted. Thus, the layer could be embossed and optionally metallised or provided with a further layer of different refractive index as is well known in the art. In the case of metallisation, this may be a full or partial metallisation or a fully metallised layer could be partially demetallised to generate a pattern or microimages. In other cases, the optically variable effect generating structure can be formed by a single layer which has been modified internally to provide the optically variable effect, for example by modifying its refractive index.

In order to bond the optically variable effect generating structure to the substrate, a facing surface of the substrate or the layer on the carrier adjacent the substrate is coated with an adhesive. Suitable adhesives include hot melt, UV or daylight cured adhesives (or other thermoplastic or thermoset types). The adhesives could be clear or be tinted and thus include for example UV fluorescent or other additive materials.

The carrier provided in step i) preferably comprises a self-supporting plastics material such as polyester, for example ICI Melinex, or polypropylene. The overall structure is preferably a selected grade of holographic or optical transfer or hot stamp foil. To assist removal, a release layer may be provided between the carrier and the optically variable effect generating structure or the carrier could be treated, for example using corona discharge and the like, to provide a controlled bonding level.

Typically, step ii) comprises providing an adhesive between the optically variable effect structure and the substrate, although the substrate could, for example, have an inherent adhesive property which is used to bond it to the optically variable effect structure. In the case of an adhesive, this would typically be hot melt adhesive although other well known types of adhesive could also be used, for example UV curable.

The substrate can comprise any conventional material such as polyester or polypropylene or indeed any polymer film which has high clarity and is suitable for use as a thread or tape. Typically, the thickness of the substrate will be in the range 11–23 µm. The substrate can be clear, tinted, back printed and the like.

It will be appreciated that following construction of the laminate (and after removal of the carrier (step iii))), the optically sensitive part of the structure is securely bonded onto the substrate with the remainder of the structure providing outward protection.

The carrier layer is permanently bonded using a suitable adhesive such as a hot melt, UV or daylight cured adhesive which again could be clear or be tinted. The carrier layer may itself be clear or tinted or printed with visible or invisible fluorescent inks and the like.

Preferably, particularly in the manufacture of security threads, following step iv) but prior to step v) the exposed surfaces of the laminate from step iv) are provided with coatings to enable the structure to be incorporated into paper. Typically, the coatings comprise a primer formed on the exposed surface and a top coat formed on the primer.

In other applications, the laminate from step iv) could be suitably coated with an adhesive on one side which is then used to allow the structure to be rolled onto the surface of a document in the form of a tape or thread.

In one preferred construction, all layers in the laminate (apart from any metallisation) are transparent to allow the optically variable effect structure to be seen from both sides. This is useful for some products where the laminate in the form of a thread or tape can be seen from both sides.

Typically, the optically variable effect structure will be in a continuous form which reduces any problems of registration.

In general, the composite structure can be used as a thread, tape or strip bonded to a security substrate before or after printing and finishing by use of cold or heat bonding adhesives.

Some examples of methods according to the invention will now be described with reference to the accompanying drawings, in which:

FIG. 1 is a schematic, cross-section through a first laminate structure;

FIG. 2 is a schematic, cross-section through a substrate and adhesive layer;

FIG. 3 is a schematic, cross-section illustrating the process of laminating together the layers shown in FIGS. 1 and 2;

Figure 4:
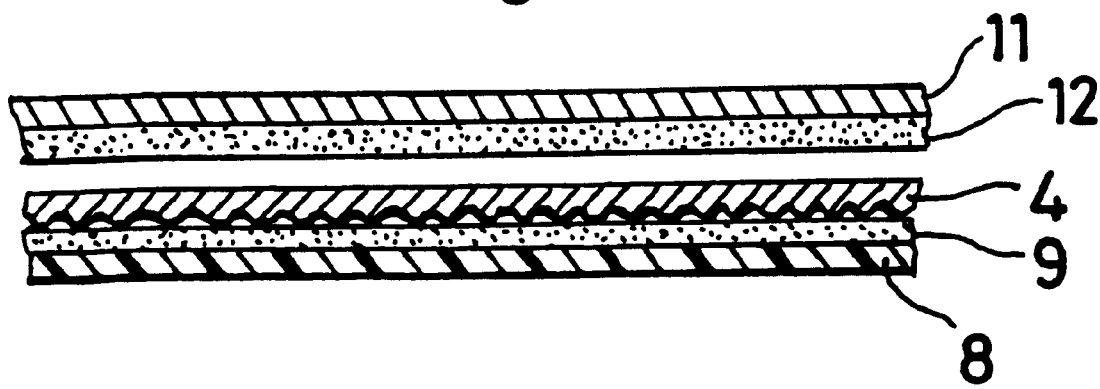
FIG. 4 is a schematic, cross-section showing the laminate of FIG. 3 just prior to bonding to the carrier; and, FIG. 5 is a schematic, cross-section through a modified form of the laminate shown in FIG. 4.

FIG. 1 illustrates a first laminate structure 1 comprising a plastics carrier 2 having a flexible form and a width of up to 1 m or more (in this case 800 mm) and a thickness in the range of 11–23 microns. Other plastics materials could also be used including, for example, OPP—oriented polypropylene. The carrier 2 could be up to 2500 m or more long. A release layer 3, for example wax, is provided on an undersurface of the carrier 2 and this is coated with an embossable lacquer (for example vinyl-acrylic) layer 4 having a thickness in the range 1–2 µm, preferably about 1.3 µm. In FIG. 1, the layer 4 is shown separate from the release layer 3 for clarity. The exposed surface 5 of the lacquer layer 4 is embossed under heat and pressure against a roller carrying continuous holographic embossing profiles and is then metallised 6 with a thin (for example 25 nm) layer of aluminium or the like in an electron beam vacuum coater. Alternatively, the metallisation 6 could be replaced by a layer of a high refractive index coating such as zinc sulphide.

The lacquer layer 4 may be clear but could alternatively be tinted. The metallisation 6 can be continuous or could be patterned or microimaged by demetallising or other techniques.

A separate laminate structure 7 (FIG. 2) is also provided comprising a plastics substrate 8 having similar dimensions to the carrier 2 and being clear or tinted and/or back printed. A surface 8A of this layer 8 is corona treated to 45 dynes/cm and coated with a hot melt adhesive 9 having a thickness in the range 1–10 µm, preferably 1–4 µm. This adhesive 9 may also be clear or tinted and optionally contain fluorescent materials and the like. The adhesive may be a polyolefin type, ethylene-vinyl acetate copolymer type, vinyl polymer, vinyl copolymer, acrylic etc. It should be stable throughout the processes and through the lifetime of the product into which it is being incorporated and is permanently bonded to the layer 8. In one example, the layer 9 comprises 2–3 micron thick vinyl chloride/vinyl acetate copolymer (88/12) from methylethyl ketone solution and dried to give a clear tack free material. Alternatives to hot melt adhesives could also be used as will be explained below.

The total laminated structure should often be kept as thin as possible, e.g. for banknote threads, and thus thinner carriers below 11 microns could be advantageously used if suitable handling equipment was used.

The two structures 1,7 shown in FIGS. 1 and 2 are then laminated together as shown in FIG. 3, with the layer 9 in contact with the metallisation 6 and layer 4, by passing them between a pair of heated rollers 10 which are urged together. The rollers are typically heated to between 140 and 160° C. which activates the adhesive layer 9. The pressure and speed of the rollers are adjusted so as to provide good bonding between the adhesive layer 9 and the lacquer layer 4 without damaging the embossed surface. The carrier layer 2 is peeled away to leave the lacquer layer 4 uppermost with the holographic/optical profile firmly bonded to the hot melt adhesive layer 9. This resultant structure shown in FIG. 3 can then be used for the basis for thread or tape structures to be described below.

Instead of using a hot melt adhesive for the layer 9, it is possible to use UV, daylight cure or other thermoset adhesives by coating the substrate 8 with a suitable adhesive and laminating using UV, daylight and/or heat and pressure through the substrate 8 to achieve bonding. This has advantages in that thermoset cross-linked resin adhesives can give better chemical resistance and heat durability and hence protect the embossed profile for enhanced security and longevity.

In a further alternative (not shown), the adhesive layer 9 could be provided on the lacquer layer 4.

The resultant laminate from FIG. 3 is permanently adhered to a further protective layer 11 which has been coated with an adhesive layer 12 (FIG. 4). The layer 11 is the same as the layer 2 previously removed. This is coated with the hot melt adhesive 12 and is then bonded to the exposed surface of the lacquer layer 4. This results in complete enclosure of the optical structure thus fully protecting it.

The advantages of using the carrier 2 for the protective layer 11 are that it improves the economics of the process, it enables the steps shown in FIGS. 3 and 4 to be carried out sequentially in line as a series process. Furthermore, if the adhesive 12 is provided by UV, daylight cure or thermosetting adhesive then a similar lamination technique can be carried out as described above.

The various plastics and adhesive layers in the laminate can be provided with additional features including print, tints, fluorescent features which may be visible or invisible, and magnetic features and the like. Variations in tint through the thickness of one of the layers can also be achieved. For example, a PET layer can be tinted so that one face is silver and the opposing face gold.

EXAMPLE

A 19 microns thick high clarity PET film 600 mm wide coated with strongly bonded clear hot melt e.g. Rhone Poulenc 10/23 high grade heat seal film was selected as the substrate 8 as shown in FIG. 2. The hot melt coating 9 was 1.5–2 μm thick.

A clear hot stamping grade foil 600 mm wide with a high level of environmental resistance from the embossable lacquer was embossed under pressure and heat at 180–200° C. with a roller covered with holograph nickel embossing shims to give high quality replication.

The embossed lacquer surface was vacuum metallised with 25 nm of pure aluminium in an electron beam machine as shown in FIG. 1.

The two layer systems from FIGS. 1 and 2 were laminated as shown in FIG. 3 at 140–160° C. surface roller temperature in the laminating roller nips 650 mm wide under controlled pressure. This allowed air removal and a strong continuous bond between the aluminium layer and hot melt. Also, the transparency was excellent so that the hologram could be viewed clearly through the PET carrier films.

The carrier film 2 as shown in FIG. 3 was continuously peeled off cleanly and rolled without damage for re-use.

The residual structure shown in FIG. 3 was then laminated in a similar fashion as shown in FIG. 4 with the removed film 2, the film 2 having been coated with 2 microns of a PVC/PVA coating.

This has not required any slitting below the original 600 mm width at this stage and the holographic image is integrally bound into the laminated structure shown in FIG. 4.

The hologram may be clearly seen from both sides of the composite wide base laminate.

The 600 mm composite was coated on both sides with proprietary solvent based hot melt coating at 4–6 μm to give clear adherent layers for subsequent bonding into paper during later processing.

This was slit to threads on a bobbin at lengths up to 3000 m and 1.5–3.0 mm wide for paper incorporation.

Threads so produced when bonded into banknote paper (as otherwise described) gave excellent optical replay characteristics and also high levels of product handling and durability in specified tests.

Figure 5:
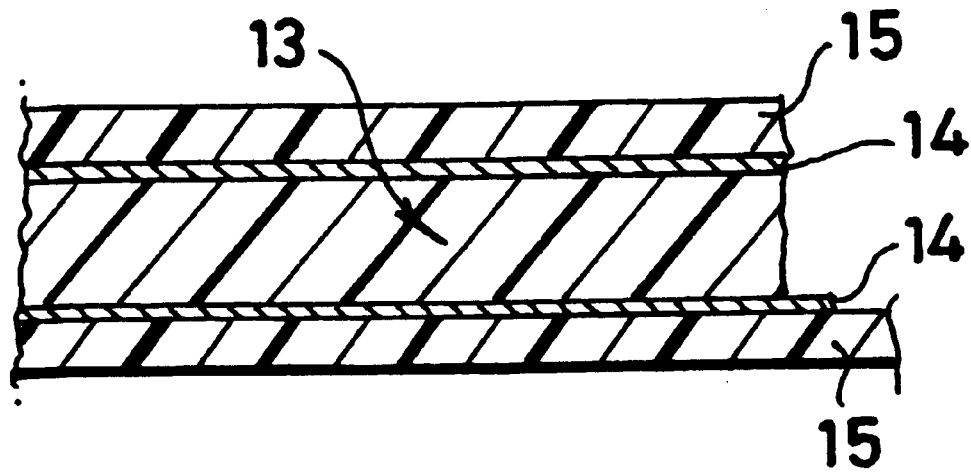

FIG. 5 illustrates at 13 the resultant laminate of FIG. 4 which, in this case, has been coated on its opposite surfaces by respective tie or primer coats 14 which will have a thickness typically in the order of 1–2 μm, the tie coats 14 being further coated with respective adhesive/binder or top coats 15 having a thickness in the order of 4–8 μm. These additional coatings 14,15 enable the resultant laminate to be more easily handled and slit further protect the lacquer layer 4 from mechanical and chemical corrosive attack, and enable the resultant threads to be bonded to paper.

The materials for these coatings 14,15 should be solvent or water based polymers, copolymers, acrylics, vinyl, polyurethanes etc. and must remain permanently clear.

Following the provision of the coatings as shown in FIG. 5, the resultant laminate is slit into threads having widths of the order of 1–10 mm, preferably 1–5 mm) and wound onto bobbins or spools at up to 6000 m in length.

In use, the spools are then mounted on the, paper making machine and the thread fed through the paper pulp across specially designed wire mesh moulds as is well known to persons of ordinary skill in the art. The coatings 14,15 are important for good performance at this stage as paper baths can be very acidic, alkaline or corrosive while temperatures of 100° C. or more are generated.

What is claimed is:

1. A method of manufacturing a laminate structure for use in a security thread or tape comprises:
   i) providing a first structure having a flexible carrier supporting an optically variable effect structure;
   ii) adhering the first structure to a flexible substrate with the optically variable effect structure between the carrier and the substrate;
   iii) removing the carrier;
   iv) permanently bonding the carrier to the optically variable effect structure to generate a final laminate structure; and,
   v) slitting the laminate structure from step iv) into at least two lengths.

2. A method according to claim 1, wherein the optically variable effect structure of the first structure includes a layer which has been embossed on its surface facing away from the carrier and an optical effect enhancing layer on the embossed surface.

3. A method according to claim 2, wherein the embossed layer is a lacquer.

4. A method according to claim 3, wherein the lacquer is tinted.

5. A method according to claim 2, wherein the optical effect enhancing layer comprises metallisation.

6. A method according to claim 5, wherein the metallisation is patterned or microimaged.

7. A method according to claim 1, wherein the carrier comprises a plastics material.

8. A method according to claim 1, further comprising providing a release layer between the carrier and the optically variable effect structure in the first structure.

9. A method according to claim 1, wherein step ii) comprises providing an adhesive between the optically variable effect structure and the substrate.

10. A method according to claim 9, wherein the adhesive is provided on the substrate, step ii) comprising bringing the first structure into contact with the adhesive on the substrate and activating the adhesive.

11. A method according to claim 9, wherein the adhesive comprises hot melt adhesive.

12. A method according to claim 1, wherein the substrate comprises a plastics material.

13. A method according to claim 1, wherein the substrate is tinted.

14. A method according to claim 1, further comprising, prior to step v), providing the exposed surfaces of the final laminate structure obtained in step iv) with coatings to enable the structure to be incorporated into paper.

15. A method according to claim 14, wherein the coatings comprise a primer formed on the exposed surface and a top coat formed on the primer.

16. A security thread or tape manufactured according to claim 14.

17. A security document to which is adhered a security thread or tape according to claim 16.

18. A method of manufacturing a security substrate for use in a security document, the method comprising forming the substrate from a pulp; manufacturing a security thread or tape according to claim 1; and, during formation of the substrate, incorporating the security thread or tape into the substrate.

19. A method of manufacturing a security substrate for use in a security document, the method comprising manufacturing a security thread or tape according to claim 1; and adhering the security thread or tape to a substrate.

20. A method according to claim 19, wherein the substrate is preprinted with security indicia.

21. A method according to claim 19, further comprising printing security indicia on the substrate following the adhering step.

22. A method according to claim 19, wherein the security thread or tape is adhered to the substrate with a holt melt, pressure sensitive or temperature sensitive adhesive.

23. A banknote which has been manufactured according to claim 18.

24. A method according to claim 7, wherein the carrier comprises PET.

25. A method according to claim 12, wherein the substrate comprises PET.

26. A method according to claim 13, wherein the substrate is tinted with a fluorescent additive.

27. A banknote to which is adhered a security thread or tape according to claim 16.

28. A method of manufacturing a security substrate for use in a banknote, the method comprising forming the substrate from a pulp and, during formation, providing a security thread or tape according to claim 16 whereby the security thread or tape is incorporated into the substrate.

29. A method of manufacturing a security substrate for use in a banknote, the method comprising manufacturing a security thread or tape according to claim 1; and adhering the security thread or tape to a substrate.

* * * * *